(12) United States Patent
Bretter et al.

(10) Patent No.: US 9,564,122 B2
(45) Date of Patent: Feb. 7, 2017

(54) LANGUAGE MODEL ADAPTATION BASED ON FILTERED DATA

(71) Applicant: NICE-SYSTEMS LTD, Ra'anana (IL)

(72) Inventors: Ronny Bretter, Kiriyat Motzkin (IL); Shimrit Artzi, Kfar Saba (IL); Maor Nissan, Herzliya (IL)

(73) Assignee: NICE LTD., Ra'anana (IL)

( * ) Notice: Subject to any disclaimer, the term of this patent is extended or adjusted under 35 U.S.C. 154(b) by 129 days.

(21) Appl. No.: 14/224,086

(22) Filed: Mar. 25, 2014

(65) Prior Publication Data

US 2015/0278192 A1    Oct. 1, 2015

(51) Int. Cl.
*G10L 15/00* (2013.01)
*G06F 17/27* (2006.01)

(52) U.S. Cl.
CPC ........... *G10L 15/00* (2013.01); *G06F 17/2785* (2013.01)

(58) Field of Classification Search
CPC ................................. G06F 17/27; G10L 15/00
See application file for complete search history.

(56) References Cited

U.S. PATENT DOCUMENTS

| | | | | |
|---|---|---|---|---|
| 6,188,976 B1 * | 2/2001 | Ramaswamy | ........ | G10L 15/183 704/1 |
| 8,352,245 B1 * | 1/2013 | Lloyd | ................... | G10L 15/183 704/9 |
| 8,543,563 B1 * | 9/2013 | Nikoulina | ........... | G06F 17/2809 704/2 |
| 8,650,031 B1 * | 2/2014 | Mamou | ................... | G10L 15/08 704/2 |
| 2001/0051868 A1 * | 12/2001 | Witschel | ............... | G10L 15/197 704/9 |
| 2002/0087315 A1 * | 7/2002 | Lee | ........................ | G06Q 30/06 704/9 |

(Continued)

FOREIGN PATENT DOCUMENTS

| | | |
|---|---|---|
| EP | 2273490 | 1/2011 |
| WO | 99/50830 | 10/1999 |
| WO | 2006/099621 | 9/2006 |

OTHER PUBLICATIONS

Lecorvé, Gwénolé, Guillaume Gravier, and Pascale Sébillot. "An unsupervised web-based topic language model adaptation method." Acoustics, Speech and Signal Processing, 2008. ICASSP 2008. IEEE International Conference on. IEEE, 2008.*

(Continued)

*Primary Examiner* — Brian Albertalli
(74) *Attorney, Agent, or Firm* — Soroker Agmon Nordman

(57) ABSTRACT

A method for adapting a language model for a context of a domain, comprising obtaining textual contents from a large source by a request directed to the context of the domain, discarding at least a part of the textual contents that contain textual terms determined as irrelevant to the context of the domain, thereby retaining, as retained data, at least a part of the textual contents that contain textual terms determined as relevant to the context of the domain, and adapting the language model by incorporating therein at least a part of the textual terms of the retained data, wherein the method is performed on an at least one computerized apparatus configured to perform the method and equipped for communication with the large source, and an apparatus for performing the same.

27 Claims, 10 Drawing Sheets

(56) References Cited

U.S. PATENT DOCUMENTS

| | | | |
|---|---|---|---|
| 2006/0178869 A1* | 8/2006 | Acero | G06F 17/2715 704/10 |
| 2006/0212288 A1* | 9/2006 | Sethy | G06F 17/2715 704/10 |
| 2010/0325109 A1* | 12/2010 | Bai | G06F 17/30864 707/737 |
| 2011/0004462 A1* | 1/2011 | Houghton | G10L 15/183 704/9 |
| 2011/0296374 A1* | 12/2011 | Wu | G06F 17/2715 717/104 |
| 2012/0102018 A1* | 4/2012 | Yang | G06F 17/3069 707/709 |
| 2012/0191694 A1* | 7/2012 | Gardiol | G06F 17/2715 707/709 |
| 2012/0232885 A1* | 9/2012 | Barbosa | G06F 17/2715 704/9 |
| 2012/0290293 A1* | 11/2012 | Hakkani-Tur | G06F 17/30864 704/9 |
| 2014/0046977 A1* | 2/2014 | Gopalakrishnan | G06F 17/28 707/776 |

OTHER PUBLICATIONS

Lecorvé, Gwénolé, et al. Supervised and unsupervised Web-based language model domain adaptation. No. EPFL-REPORT-192737. Idiap, 2012.*

Zhu, Xiaojin, and Ronald Rosenfeld. "Improving trigram language modeling with the world wide web." Acoustics, Speech, and Signal Processing, 2001. Proceedings.(ICASSP'01). 2001 IEEE International Conference on. vol. 1. IEEE, 2001.*

Bulyko, Ivan, et al. "Web resources for language modeling in conversational speech recognition." ACM Transactions on Speech and Language Processing (TSLP) 5.1 (2007): 1.*

Kilgarriff, Adam, and Gregory Grefenstette. "Introduction to the special issue on the web as corpus." Computational linguistics 29.3 (2003): 333-347.*

Wan, Vincent, and Thomas Hain. "Strategies for language model web-data collection." Acoustics, Speech and Signal Processing, 2006. ICASSP 2006 Proceedings. 2006 IEEE International Conference on. vol. 1. IEEE, 2006.*

Yoshino, Kohzoh, Shinsuke Mori, and Toshio Kawahara. "Incorporating semantic information to selection of web texts for language model of spoken dialogue system." Acoustics, Speech and Signal Processing (ICASSP), 2013 IEEE International Conference on. IEEE, 2013.*

Gabrilovich, Evgeniy and Markovitch, Shaul. "Computing Semantic Relatedness Using Wikipedia-Based Explicit Semantic Analysis". Department of Computer Science, TECHION—Israel Institute of Technology, 32000 Haifa, Israel.

Gales, Mark and Young, Steve. "The Application of Hidden Markov Models in Speech Recognition". Foundations and Trends in Signal Processing, vol. 1, No. 3 (2007) 195-304.

Saif Mohammad. "Measuring Semantic Distance using Distributional Profiles of Concepts". Department of Computer Science University of Toronto, CA.

* cited by examiner

Prior Art

LANGUAGE MODEL ADAPTATION BASED ON FILTERED DATA

BACKGROUND

The present disclosure generally relates to textual terms recognition, and more specifically to speech recognition using a language model adapted with external data.

Some attempts to extend data for training a model for speech recognition are known in the art, as exemplified in the following publications.

WO1999/050830 which reports language model used in a speech recognition which has access to a first smaller data store and a second, larger data store. The language model is adapted by formulation an information retrieval query based on information contained in the first data store and querying the second data store. Information retrieved from the second data store used in adapting the language model.

EP2273490 reports a speech recognition device that may adapt or otherwise modify a generic language model based on a retrieved corpus of text.

WO2006/099621 reports forming and/or improving a language model based on data from a large collection of documents, such as Web data. The collection of documents is queried using queries that are formed from the language model. The language model is subsequently improved using the information thus obtained and the improvement is used to improve the query.

SUMMARY

A non-limiting aspect of the present disclosure is modifying a language model by acquiring textual contents from a sufficiently rich resource of information, discarding contents that do not pertain to a designated subject matter, and incorporating in the language model remaining textual contents that do pertain to the designated subject matter, thereby increasing the recognition reliability of the modified language model with respect to data related to the designated subject matter without unfavorable effects by terms that do not pertain to the designated subject matter.

One exemplary embodiment of the disclosed subject matter is a method for adapting a language model for a context of a domain, comprising obtaining textual contents from a large source by a request directed to the context of the domain, discarding at least a part of the textual contents that contain textual terms determined as irrelevant to the context of the domain, thereby retaining, as retained data, at least a part of the textual contents that contain textual terms determined as relevant to the context of the domain, and adapting the language model by incorporating therein at least a part of the textual terms of the retained data, wherein the method is performed on an at least one computerized apparatus configured to perform the method and equipped for communication with the large source.

Another exemplary embodiment of the disclosed subject matter is a method for adapting a baseline language model for a context of a domain by data of the Web, comprising obtaining, from the domain, data representative of the context of the domain, and based on the data representative of the context of the domain, forming a query that is provided to an at least one search engine of the Web, thereby acquiring an at least one result comprising textual contents, and discarding at least a part of the at least one result in which the textual contents includes at least one textual term that does not pertain to the data representative of the context of the domain, and adapting the baseline language model to an adapted language model by incorporating therein textual terms of the at least one result that pertain to the data representative of the context of the domain, wherein the method is performed on an at least one computerized apparatus configured to perform the method and equipped for communication with at least one computerized server linkable to the Web.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings may be labeled with the same reference numeral, optionally with an additional letter, and may not be repeatedly labeled and/or described.

Figure 1A:
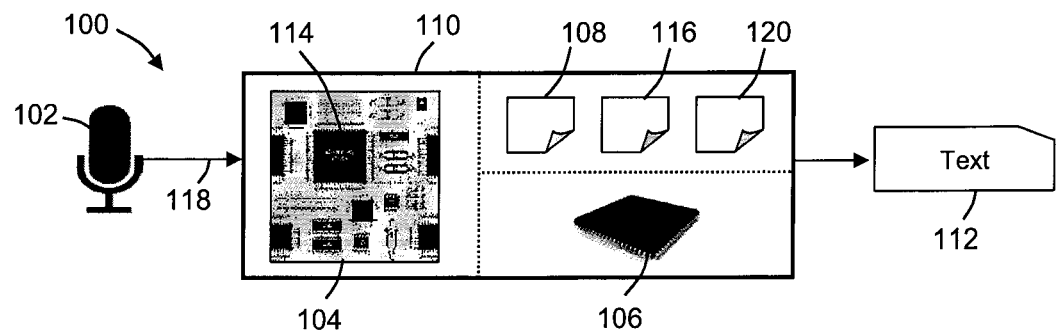

References to previously presented elements are implied without necessarily further citing the drawing or description in which they appear.

Figure 1B:
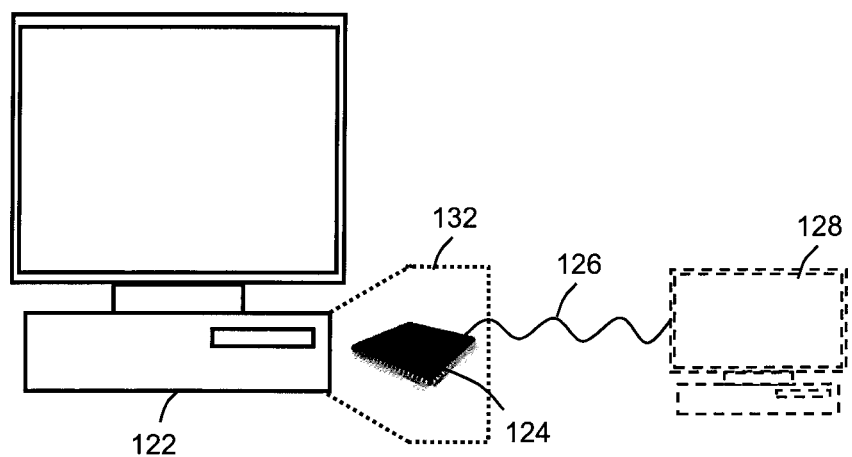
Figure 2:
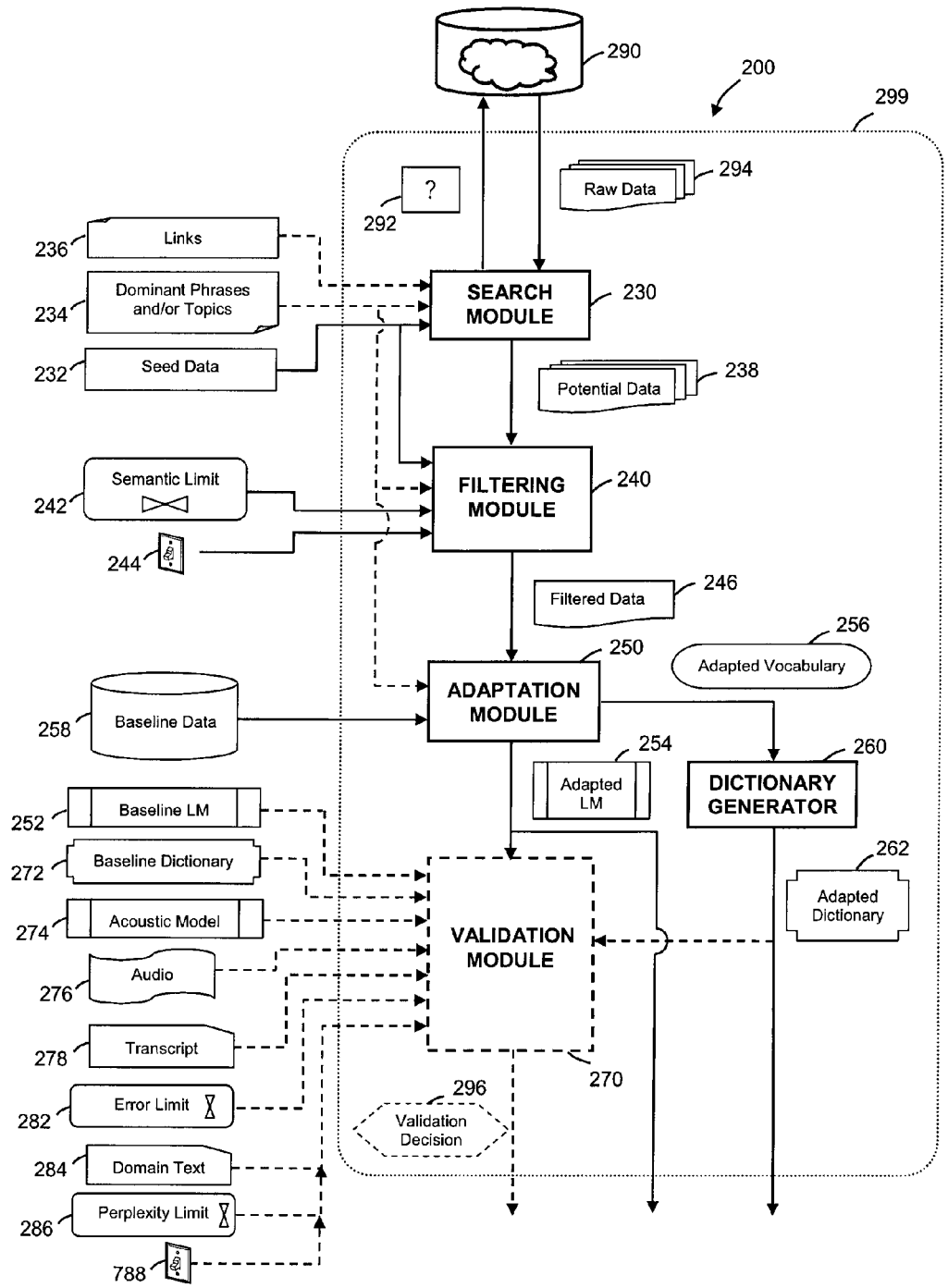
Figure 3:
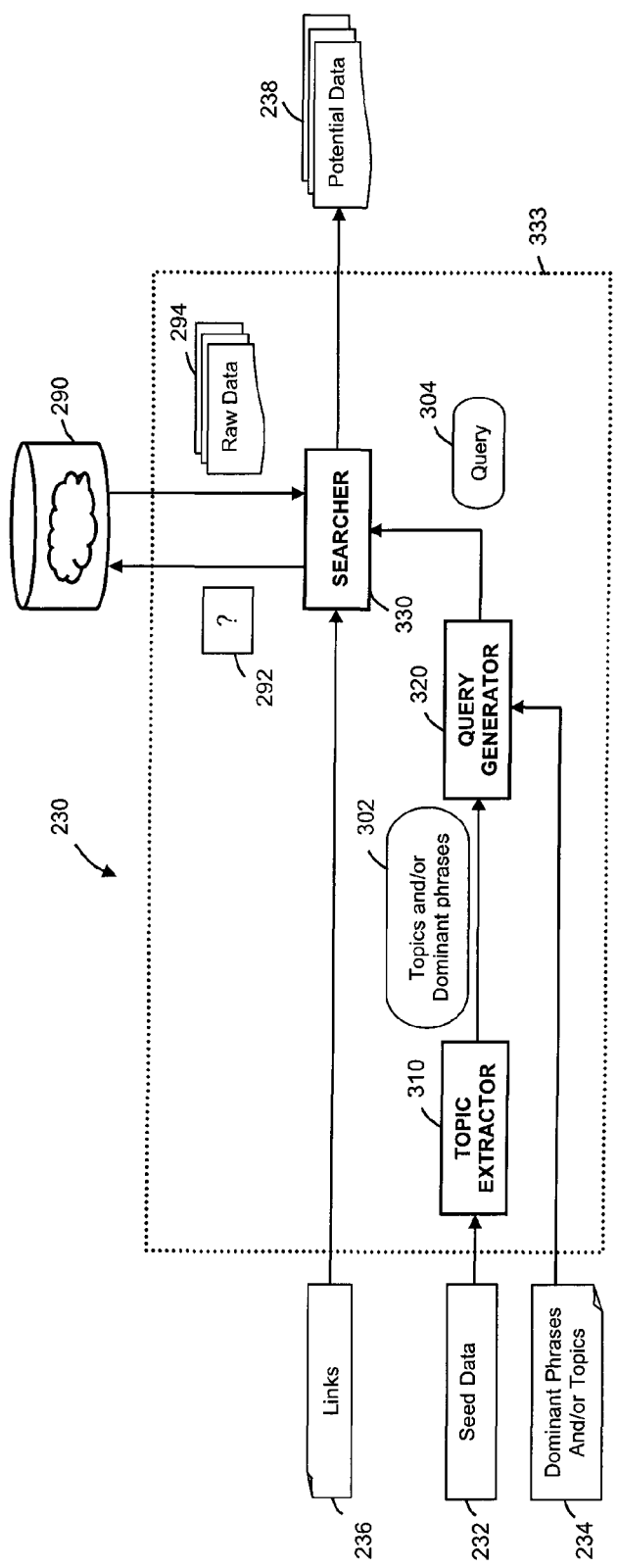
Figure 4:
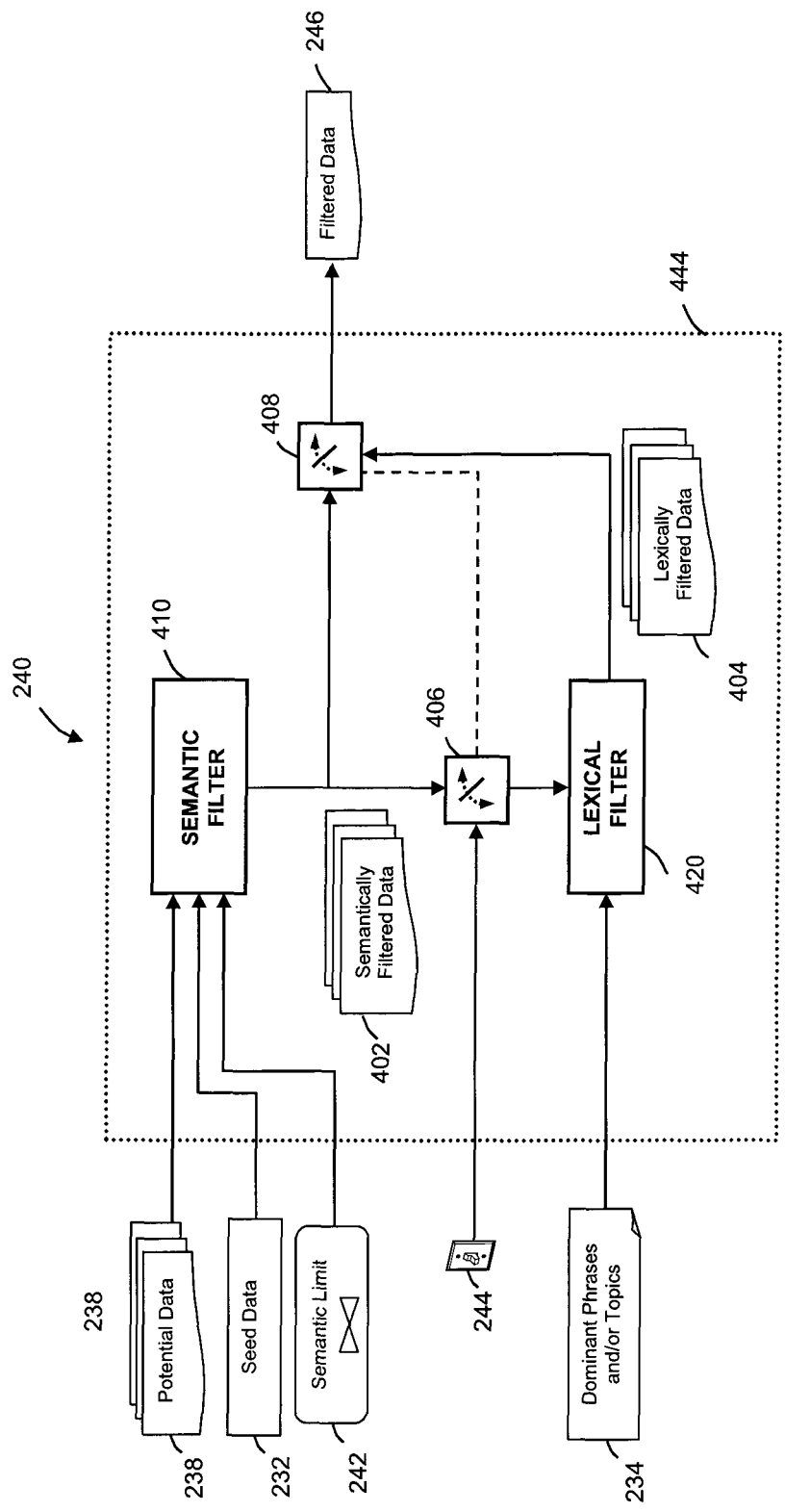
Figure 5:
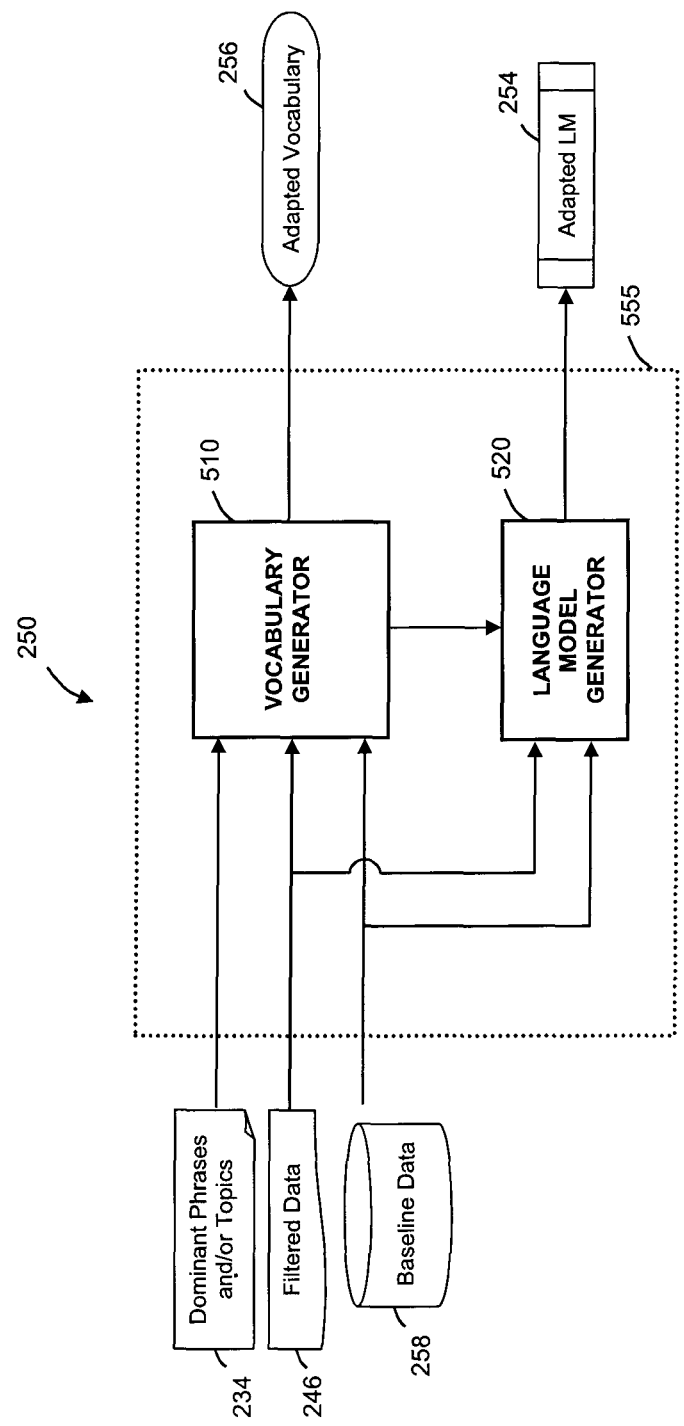
Figure 6:
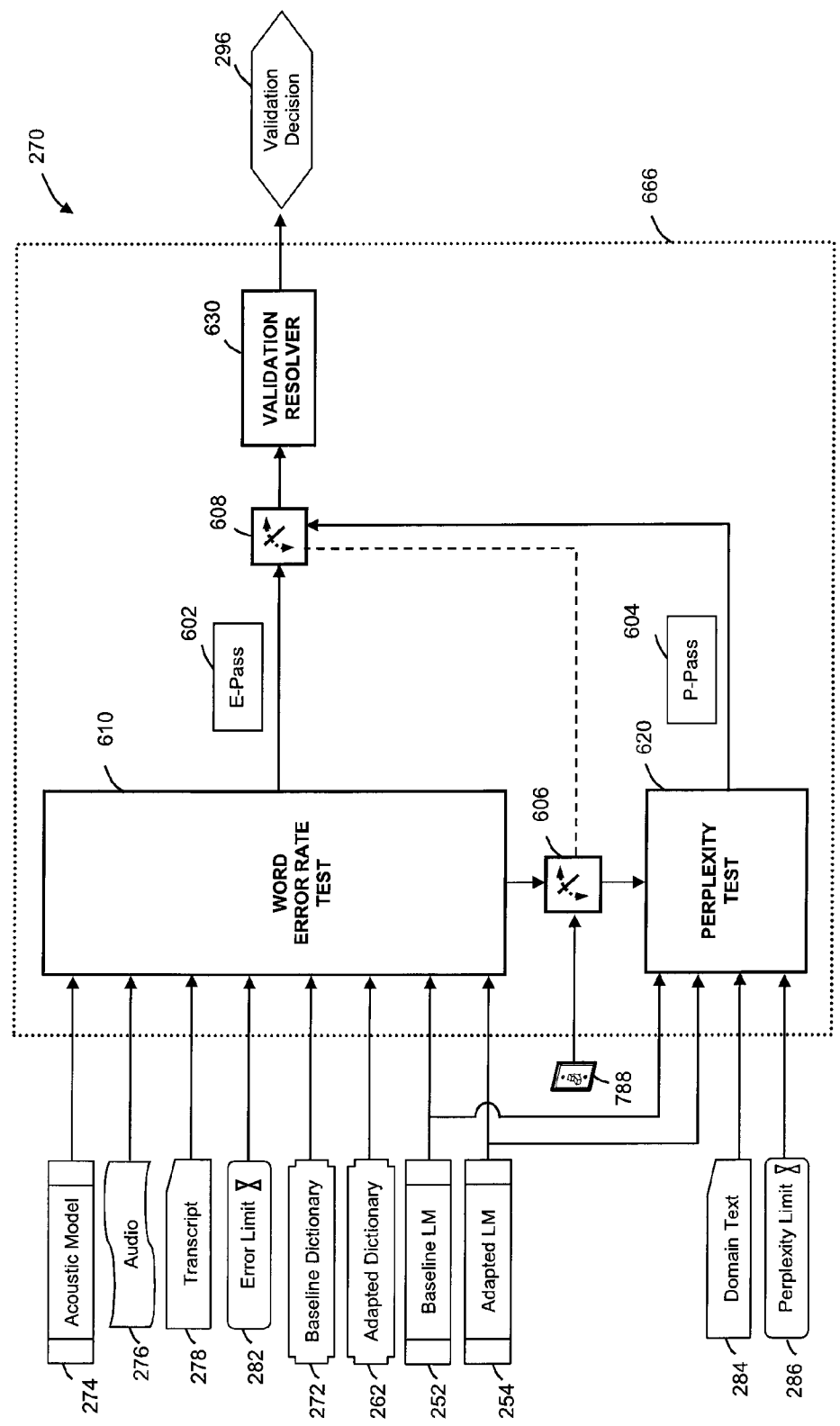
Figure 7:
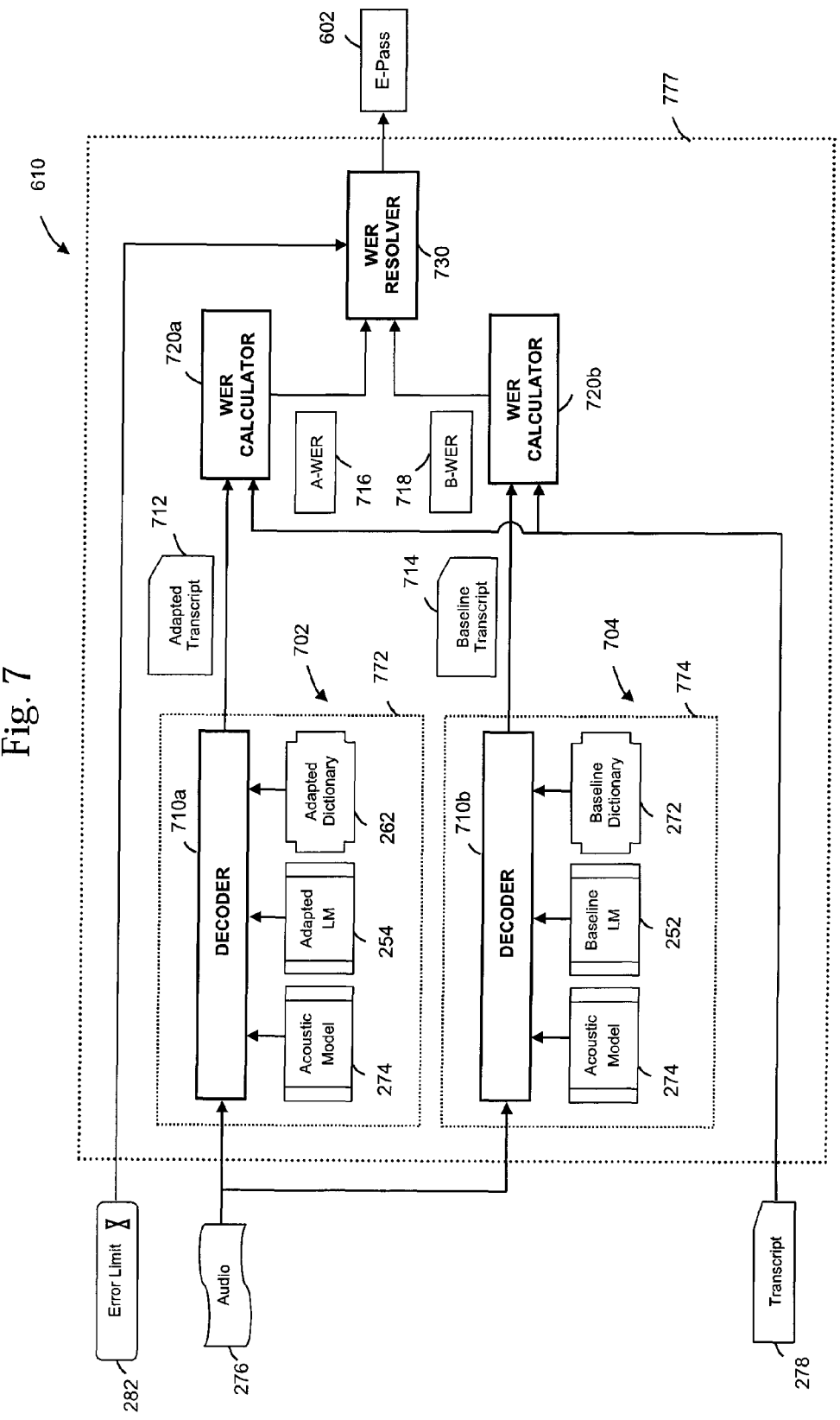
Figure 8:
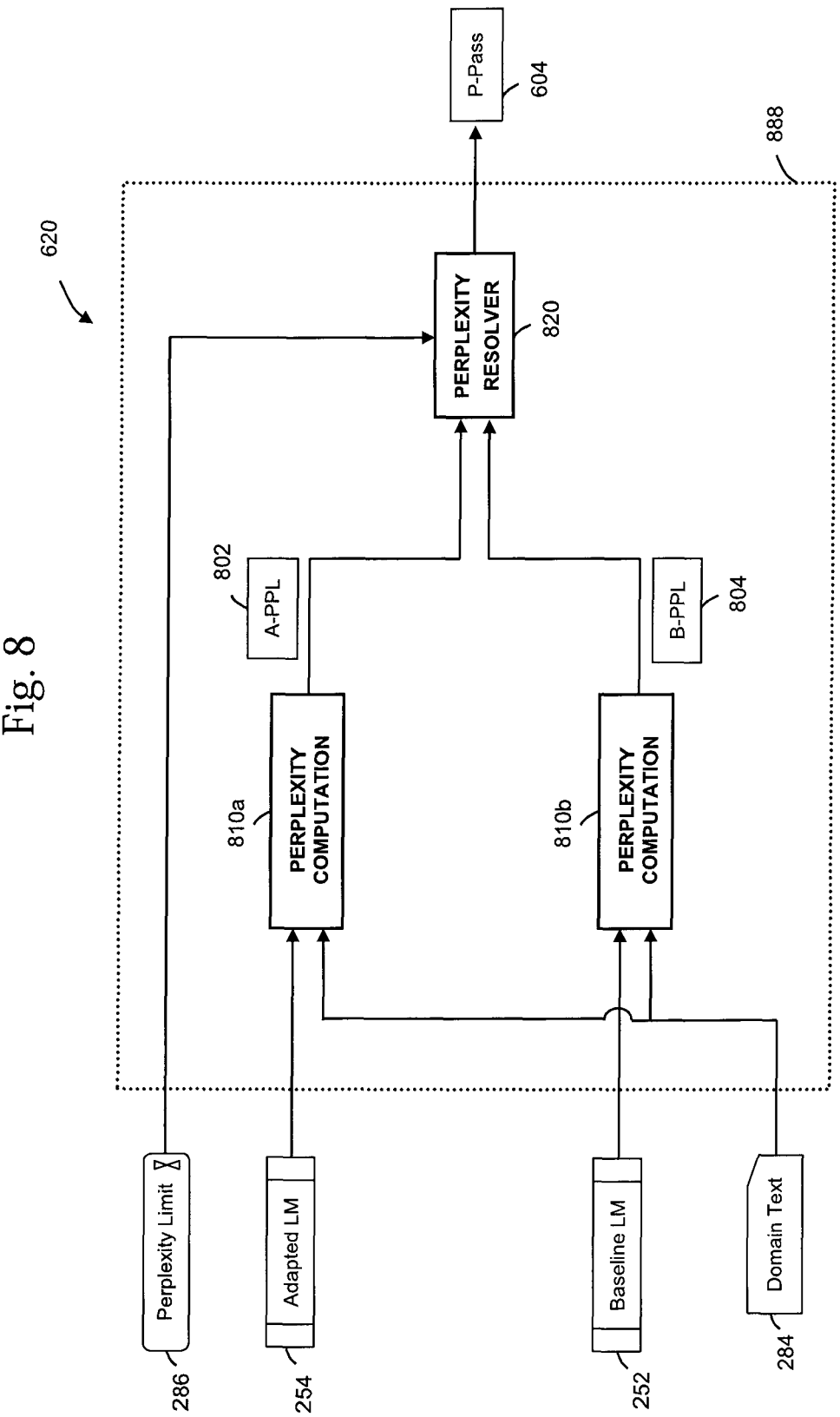
Figure 9:
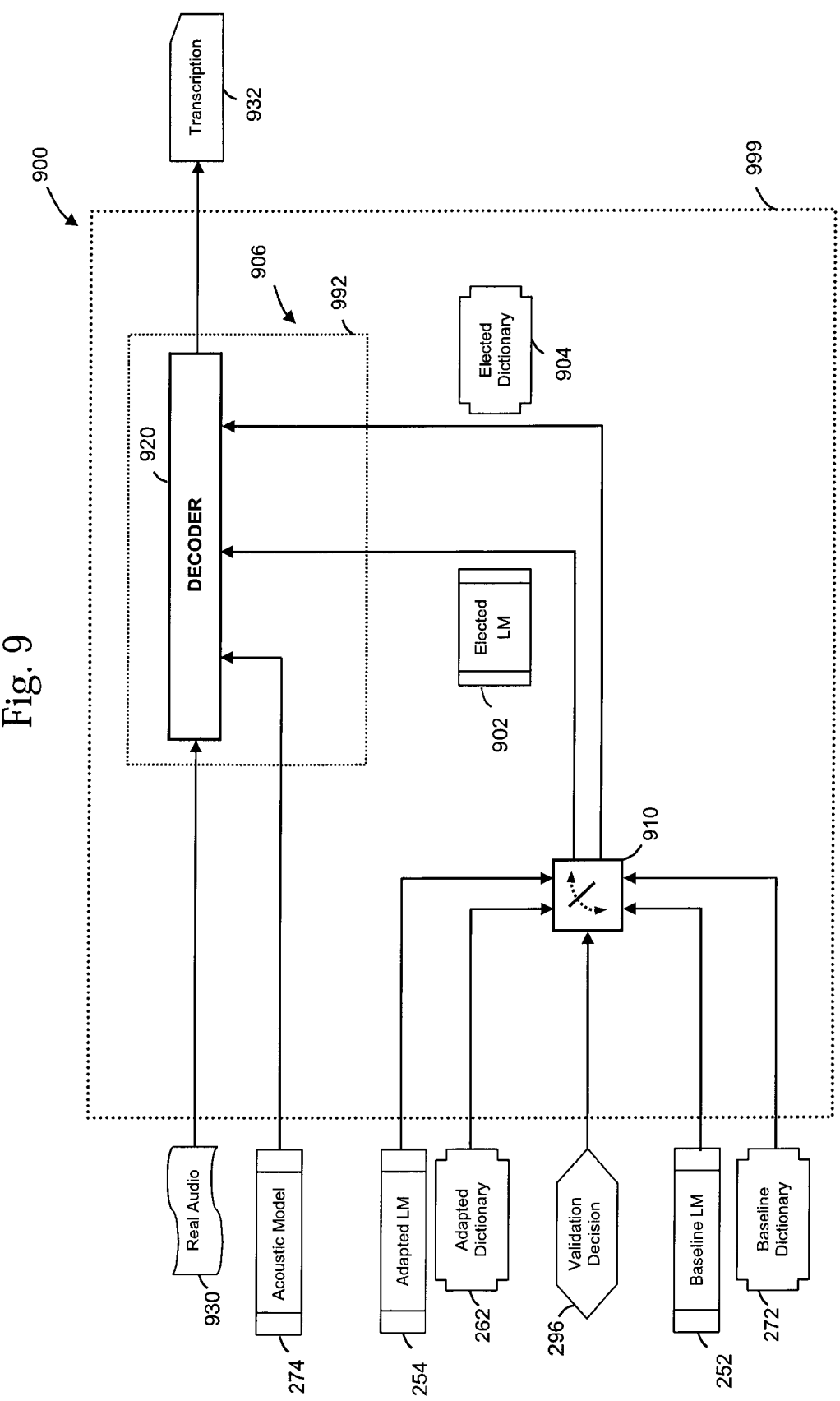
Figure 10:
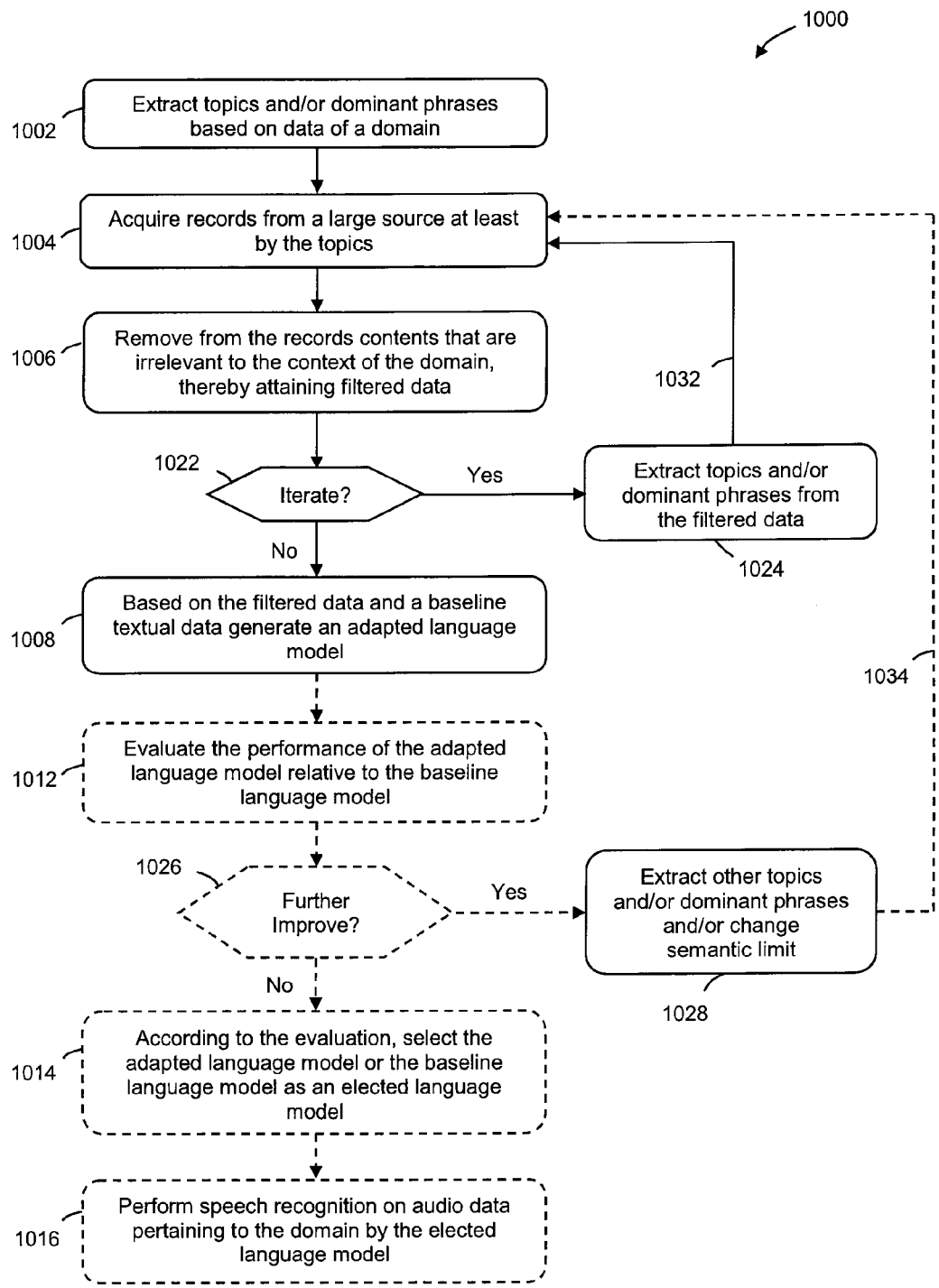

FIG. 1A schematically illustrates an apparatus for speech recognition;

FIG. 1B schematically illustrates a computerized apparatus for obtaining data from a source;

FIG. 2 schematically illustrates data structures and control flow in operations of adapting a language model, according to exemplary embodiments of the disclosed subject matter;

FIG. 3 schematically illustrates data and control flow of a search module, according to exemplary embodiments of the disclosed subject matter;

FIG. 4 schematically illustrates data and control flow of a filtering module, according to exemplary embodiments of the disclosed subject matter;

FIG. 5 schematically illustrates data and control flow of an adaptation module, according to exemplary embodiments of the disclosed subject matter;

FIG. 6 schematically illustrates data and control flow of a validation module, according to exemplary embodiments of the disclosed subject matter;

FIG. 7 schematically illustrates data and control flow of an error rate test, according to exemplary embodiments of the disclosed subject matter;

FIG. 8 schematically illustrates data and control flow of a perplexity test, according to exemplary embodiments of the disclosed subject matter;

FIG. 9 schematically illustrates election of a language model and corresponding phonetic dictionary and employment thereof for transcription of an audio data, according to exemplary embodiments of the disclosed subject matter; and FIG. 10 outlines operations of adapting a language model and using thereof, according to exemplary embodiments of the disclosed subject matter.

DETAILED DESCRIPTION

In the context of the present disclosure, without limiting and unless otherwise specified, referring to a 'phrase' implies one or more words and/or one or more sequences of words and/or a one or more sentences and/or a text document or excerpt thereof, wherein a word may be represented by a linguistic stem thereof. Notwithstanding the above, a phrase may be a word or word combination of unique meaning in the context where they appear, for example, 'spaceshuttle', 'artificial intelligence' or a name of an organization or a product name. For instance, the word 'apple' may be insignificant though in a context of computers and/or telephony it may be unique and refer to Apple Inc (Cupertino, Calif., U.S.A).

Generally, in the context of the present disclosure, without limiting, a vocabulary denotes an assortment of terms as words and/or text such as phrases and/or textual expressions and/or excerpts from documents.

Generally, in the context of the present disclosure, without limiting, a language model is any construct reflecting occurrences of words or phrases or terms in a given vocabulary, so that, by employing the language model, words of phrases of and/or related to the vocabulary provided to the language model can be recognized, at least to a certain faithfulness.

Without limiting, a language model is a statistical language model where phrases, and/or combinations thereof, are assigned probability of occurrence by means of a probability distribution. Such a model is referred to herein, representing any language model such as known in the art.

In the context of the present disclosure, without limiting, a baseline language model or a basic language model imply a language model trained and/or constructed with a vocabulary generally of common everyday phrases and/or unrelated to a particular subject matter and texts in which the distribution of words is generally and/or approximately as common in the respective spoken language. One or more source or a resource of such a vocabulary is also referred to as baseline textual resources.

In the context of the present disclosure, without limiting, referring to a domain implies a field of knowledge and/or a field of activity of a party. For example, a domain of business of a company.

In some embodiments, a domain refers to a certain context of speech audio and may be, for example, audio recordings from a call center of an organization. Generally, without limiting, a domain encompasses a unique language terminology and unique joint words statistics which may be used for lowering the fundamental uncertainty in distinguishing between different sequences of words alternatives in decoding of a speech.

In the context of the present disclosure, without limiting, referring to data of a domain or a domain data implies phrases used and/or potentially used in a domain and/or context thereof. For example, 'product', 'model', 'failure' or 'serial number' in a domain of customer service for a product. Further, domain data may also comprise a set of sentences that pertain to the domain. For brevity and streamlining, in referring to contents of a domain the data of a domain is implied. For example, getting from a domain implies getting from the data of the domain.

In the context of the present disclosure, without limiting, referring to a domain of interest implies particular domain and/or data thereof for which a language model is adapted.

In the context of the present disclosure, without limiting, referring to a topic implies a text, comprising one or more words or phrases, directed to a subject matter and/or an issue and/or an objective thus uniquely identifying and/or summarizing the subject matter and/or issue and/or objective. For example, 'smartphones', 'television technology', or 'television shows'.

In the context of the present disclosure, without limiting, referring to a dominant phrase implies a unique word or phrase that is frequent in a certain domain more than in a general language. For example, the phrase: "change phone battery" is dominant in the cellular domain or context thereof.

In the context of the present disclosure, without limiting, referring to an utterance implies a textual statement or a sentence or a part thereof.

In the context of the present disclosure, without limiting, referring to a user implies a person operating and/or controlling an apparatus or a process.

In the context of the present disclosure, without limiting, referring to the Web implies the World-Wide-Web as known in the art.

In the context of the present disclosure, without limiting, referring to URL (Uniform Resource Locator) implies an address of a Web page, wherein referring to a page implies a single textual unit that may include one or more utterances, wherein an utterance refers to a sentence or a continuous part of a sentence.

In the context of the present disclosure, without limiting, referring to a large source implies a sufficiently rich resource of information and/or textual content, optionally with respect to a context such as of a domain, and having and/or capable to provide large variety of phrases related to the context, and determined and/or predicted and/or estimated, such as by a user, to be sufficient for an intent such as of a user. An example of sufficiently rich resource is the Web, or Wikipedia (Wikimedia Foundation) or Encyclopedia Britannica (Encyclopaedia Britannica, Inc) or Merriam-Webster's Online Dictionary (Merriam-Webster, Inc.). The large source is accessible, directly and/or indirectly, by a computerized apparatus such as a computer or a mobile device.

In the context of the present disclosure, without limiting, referring to a transcription implies a text that was generated from a conversion of speech to text. In this context, a human transcription refers to speech to text conversion that was generated by manual human process.

In the context of the present disclosure, without limiting, referring to a record implies related items of information handled and/or obtained as a unit.

In the context of the present disclosure, without limiting, referring to a search engine implies software and/or techniques as known in the art, such as of Google (Google Inc.) or Yahoo (Yahoo Inc.). The search engine generally provides one or more records responsive to a query.

In the context of the present disclosure, without limiting, referring to a phonetic dictionary implies to a data structure such as a file containing a mapping of a vocabulary of words to sequences of speech fragments such as phonemes. In some embodiments, each word can have one or more corresponding sequences of speech fragments.

In the context of the present disclosure, without limiting, referring to an acoustic model implies a data structure such as a file that contains statistical representations of each of the distinct sounds that makes up a word and probabilistically maps the speech fragments to acoustic features.

In some of the drawings and consequently in the description below, the phrase 'LM' appears, denoting a language model.

The terms cited above denote also inflections, conjugates and pluralities thereof.

One technical problem dealt by the disclosed subject matter is expanding and/or refining the recognition scope of a basic language model to enhance the prediction and recognition fidelity of phrases in data related to a distinctive subject matter when operating in an apparatus configured for phrase recognition by a language model.

One technical solution according to the disclosed subject matter is generating, based on a representative text of the distinctive subject matter, queries directed to the distinctive subject matter that are provided to a search engine of the Web, and acquiring data obtained by the search engine. Consequently, the acquired data and/or elements thereof and/or a part thereof that do not conform to the representative text are discarded, and the basic language model is modified by incorporating therein new phrases in the remaining acquired data that conform to the representative text, thereby expanding the scope of the basic language model to suit the context of the distinctive subject matter and avoid discrepancies due to immaterial phrases.

The incorporation of the new phrases in the basic language model is carried out, for example, by including the new phrases into the learning or training process of adapting the basic language model for the distinctive subject matter, thus, refining the joint words probability distribution and expanding the vocabulary scope of the adapted model.

In some embodiments, at least a part of the remaining acquired data having at least one textual term which do not match any element in a provided set of at least one textual term is discarded prior to adapting or modifying the basic language model.

In some embodiments, the representative text is extracted or derived from a certain domain and/or a representative sample thereof, so that the basic language model is adapted to cope with the context of the domain.

In some embodiments, phrases in the remaining acquired data are incorporated into a joint probability distribution over sequences of phrases belonging to the expanded vocabulary scope. For example, the incorporation is based on the frequency of the phrases in the remaining acquired data.

In some embodiments, a phrase conforms to a representative text of a domain when there is a sufficient preset and/or determined match and/or overlap with the representative text, and/or as determined by using techniques for semantic similarity or relationship such as semantic distance or semantic mapping as known in the art.

In some embodiments, the recognition performance of the adapted language model is checked relative to the basic language model to validate whether a sufficiently better recognition is achieved with respect to the context of the of the domain.

A potential technical effect of the disclosed subject matter is an apparatus for speech text recognition configured by a language model adapted to enhance the reliability of textual recognition of non-textual content related to a certain domain.

In the description above, referring to a representative text does not preclude a plurality of representative texts.

A general non-limiting overview of practicing the present disclosure is presented below. The overview outlines exemplary practice of embodiments of the present disclosure, providing a constructive basis for variant and/or alternative and/or divergent embodiments, some of which are subsequently described.

For brevity and clarity, without limiting, speech recognition from a speech audio signal or a recording is generally related to below.

FIG. 1A schematically illustrates an apparatus 100 for speech recognition, as also known in the art.

The apparatus comprises an audio source of speech, represented schematically as a microphone 102 that generates an audio signal depicted schematically as an arrow 118. The audio signal is fed into a processing device 110 that converts or decodes the audio signal into a sequence or stream of textual items as indicated with symbol 112.

Generally, processing device 110 comprises an electronic circuitry 104 which comprises an at least one processor such as a processor 114, an operational software represented as a program 108, a speech recognition component represented as a component 116 and a speech decoder represented as a component 120. Optionally, component 116 and component 120 may be combined.

Generally, without limiting, component 116 comprises and/or employs three parts or modules (not shown) as (1) a language model which models the probability distribution over sequences of words or phrases, (2) a phonetic dictionary which maps words to sequences of elementary speech fragments, and (3) an acoustic model which maps probabilistically the speech fragments to acoustic features.

The audio signal may be a digital signal, such as VoIP, or an analog signal such as from a conventional telephone. In the latter case, an analog-to-digital converter (not shown) comprised in and/or linked to processing device 110 such as by an I/O port is used to convert the analog signal to a digital one.

Thus, processor 114, optionally controlled by program 108, employs the language model, optionally together with any necessary components of processing device 110, to recognize phrases expressed in the audio signal and generates textual elements such as by methods or techniques known in the art and/or variations or combinations thereof.

In some embodiments, program 108 and/or component 116 and/or component 120 and/or parts thereof are implemented in software and/or one or more firmware devices such as represented by an electronic device 106 and/or any suitable electronic circuitry.

FIG. 1B schematically illustrates a computerized apparatus 122 for obtaining data from a source.

Computerized apparatus 122, illustrated by way of example as a personal computer, comprises a communication device 124, illustrated as an integrated electronic circuit in an expanded view 132 of computerized apparatus 122.

By employing of communication device 124, computerized apparatus 122 is capable to communicate with another device, represented as a server 128, as illustrated by a communication channel 126 which represents, optionally, a series of communication links.

One of the characteristics of the present disclosure is expanding or adapting a scope of a language model by incorporating phrases that pertain to a particular domain that are obtained or acquired from a sufficiently rich resource of information or textual content such as the internet, while discarding phrases that do not pertain to the domain. Thus, the adapted language model is enriched with phrases related to the domain rendering the adapted language model for compatibility with the context of the domain so that, at least potentially, the reliability of phrase recognition in data of or related to the domain is increased without adversely affecting the recognition performance and fidelity by superfluous and/or irrelevant phrases.

Referring herein to phrases pertaining to a domain implies, at least in some embodiments, phrases that are relevant and/or match and/or sufficiently semantically close to phrases of the domain.

The phrases are obtained or acquired from a source by employing a computerized apparatus, such as general purpose computer, equipped or outfitted with electronic facilities and/or other devices for communicating with a source such as a computerized server, either directly and/or indirectly via one or more intermediate computerized devices, as schematically illustrated, for example, by computerized apparatus 122.

FIG. 2 schematically and globally illustrates an apparatus 200, represented by a dotted frame 299, for adaptation of a language model for a context of a domain, according to exemplary embodiments of the disclosed subject matter.

Apparatus 200 comprises several modules that operate based on provided and acquired data, where data and control flow are indicated by arrows as described below, and where for clarity dashed arrows and units indicate optional operations.

Apparatus 200 comprises a search module, denoted as a search module 230, for obtaining data from a large source, denoted as a source 290.

Search module 230 is provided with a main or a default input of a seed data based on data of the domain, denoted as a seed data 232, comprising one or more textual phrases pertaining to a domain of interest as, for example, derived from data of the domain of interest.

Optionally, search module 230 is further provided with dominant phrases and/or topics, denoted as dominant phrases and/or topics 234, which pertain or relate to the domain of interest. The dominant phrases may be defined by a user and/or obtained or derived from a source such as the domain of interest or a domain related to the domain of interest. In some embodiments, the dominant phrases include and/or constitute one or more topics related to the domain of interest.

Optionally and/or alternatively, search module 230 is further provided with one or more links, such as URLs, denoted as links 236, which can refer, directly and/or indirectly to source 290, where the links are generally intended to access contents pertaining to the domain of interest.

By the provided input search module 230 generates a request or multiple requests, denoted as a request 292, which is used to request or query a search for data in source 290 such as by a search engine. Thus, by the provided input, a request is directed to source 290 for the context of the domain of interest.

Search module 230 obtains or acquires the data such as search results, denoted as raw data 294, which are provided responsive to the query.

Raw data 294, possibly after some processing such as removal of inappropriate characters and/or formatting and/or arrangement, is provided as potential data, denoted as potential data 238, for adapting a language model and.

Apparatus 200 further comprises a filtering module, denoted as a filtering module 240, for filtering out from the potential data elements or ingredients which are considered as irrelevant to the domain of interest and/or as having adverse effect on the language model adaptation with respect to the domain of interest.

Thus, search module 230 provides potential data 238 to filtering module 240, and filtering module 240 is further provided with seed data 232 and dominant phrases and/or topics 234 for filtering out irrelevant data from potential data 238. Filtering module 240 comprises or involves a component for semantic similarity or relationship. Filtering module 240 is further provided with a threshold or a limit, denoted as a semantic limit 242, for semantic oriented decision as described below. The filtering may also involve removal of utterances that don't pertain to the domain of interest which may be turned on or off by a control input or switch, denoted as a switch 244, which is further provided to filtering module 240.

After filtering potential data 238 by filtering module 240 and, optionally, after formatting and/or arrangement of the potential data, a filtered data, denoted as filtered data 246, is formed by filtering module 240.

Apparatus 200 further comprises a language model adaptation module, denoted as adaptation module 250, which receives as input baseline textual resources, denoted as baseline data 258, and filtered data 246, and, optionally, dominant phrases and/or topics 234.

Based on the input thereof, adaptation module 250 generates an adapted language model, denoted as adapted LM 254, and an adapted vocabulary, denoted as an adapted vocabulary 256, which are better adapted, at least potentially, for the domain of interest relative to a baseline language model, denoted as a baseline LM 252.

Apparatus 200 further comprises a phonetic dictionary generation module, denoted as a dictionary generator 260, which based on adapted vocabulary 256 generates a phonetic dictionary, denoted as an adapted dictionary 262, which maps the words in adapted vocabulary 256 to a sequence of speech fragments or plurality of sequences of speech fragments.

Principally, the adaptation output of apparatus 200 comprises of adapted LM 254, adapted vocabulary 256 and, indirectly, adapted dictionary 262.

However, in order to check or validate that the speech recognition performance based on adapted LM 254 and corresponding adapted dictionary 262 is indeed more suitable for the domain of interest relative to the baseline language model, such as for recognizing terms that pertain to the domain of interest, apparatus 200 further comprises a language model validation module, denoted as a validation module 270, for optional validation of the suitability of the adapted language model for the context of the domain of interest.

The process of validation module 270 comprises basically a comparison of the performance of the adapted language model relative to the baseline language model with respect to errors or word error rate, and for that purpose validation module 270 is provided with the following inputs:

Baseline LM 252.
A baseline phonetic dictionary, denoted as a baseline dictionary 272.
A baseline acoustic model, denoted as an acoustic model 274.
Adapted LM 254.
Adapted dictionary 262.
A set of test audio signals of speech, denoted as an audio 276, though not precluding a single test audio signal.
Accurate transcripts of the test audio signals, as, for example, performed by a person, and denoted as a transcript 278.
An error rate limit or threshold, denoted as an error limit 282.

Optionally, in case the performance of the adapted language model with respect to errors has passed, a further test is optionally performed to compare the predictive capability of the adapted language model versus the baseline language model with respect to a set of test text pertaining to the domain of interest. The predictive capability of a language model may be judged by perplexity as known in the art, for example, as in Gales M J F, Young S, *The application of hidden Markov models in speech recognition, Foundations and Trends in Signal Processing*, 2008, 1(3): 195-304, or Philipp Koehn, *Statistical Machine Translation*, ISBN 9780521874151.

For the perplexities test the following inputs are provided:
A test text pertaining to the domain, denoted as a domain text 284.
A perplexity test limit or threshold, denoted as a perplexity limit 286.

A control or switch indicating whether to perform the perplexities test, denoted as a switch 788.

The validation outcome or decision, denoted as a validation decision 296, is formed as a binary code such as True/False or 1/0 indicating whether the validation has passed or failed. In case the validation test has passed then adapted LM 254 and corresponding adapted dictionary 262 are elected for further use for speech recognition of context of the domain of interest. In case the adapted language model failed the validation, the adapted language model may be discarded and baseline LM 252 and corresponding baseline dictionary 272 are elected, or, alternatively, the adaptation process is renewed based on different inputs such as different seed data.

The operations of the cited modules of apparatus 200 are further elaborated below.

Apparatus 200 and/or any one of the modules thereof and/or any part of the modules may be implemented as software and/or hardware and/or firmware or as any combination thereof.

In some embodiments, any one of the modules of apparatus 200 may be implemented separately of other modules.

Further, in some embodiments, the operation of apparatus 200 may be varied. For example, instead of seed data 232, only dominant phrases are provided, optionally with links 236.

In the following descriptions regarding the modules and parts thereof of apparatus 200, the inputs and outputs are based on apparatus 200 and parts of the modules and are implied by the drawings and are not necessarily further described.

Search module 230 comprises three components operative therein, as explained along with the description below.

One component of search module 230 for deriving or extracting a topic or topics and/or dominant phrases pertaining or related to the domain of interest, said component denoted as a topic extractor 310, receives seed data 232 and derives therefrom one or more topics and/or dominant phrases, denoted as topics and/or dominant phrases 302.

In some embodiments, the topics are based on the most frequent words, up to a limit, in seed data 232. For example, the operation of topic extractor 320 is based on a TF-IDF (term frequency-inverse document frequency) algorithm, where the 'top-N' cardinal words or phrases can be chosen as the selected topics or phrases, where 'N' refers to a maximum number of topics or phrases as pre-set and/or as defined by a user.

The topics may be derived as described, for example, in section 1.3.1 of Rajaraman, Anand, and Jeffrey David Ullman, *Mining of massive datasets*, Cambridge University Press, 2012, or by a semantic data extractor as described, for example, in E. Gabrilovich and S. Markovitch, *Computing semantic relatedness using wikipedia-based explicit semantic analysis*, Proceedings of The 20th International Joint Conference on Artificial Intelligence, Hyderabad, India, January 2007.

Another component for generating a query to the source 290, said component denoted as query generator 320, receives topics and/or dominant phrases 302 and, at least optionally, dominant phrases and/or topics 234, and generates query 304. The query is a phrase or logical expressions of terms based on the topics and optional dominant phrases. For example, a query related to television technology may be 'television AND technology'.

Another component for inquiry of and/or requesting data from source 290 and acquiring data therefrom, said component denoted as searcher 330, receives query 304 and, at least optionally, links 236, and generates request 292. Searcher 330 uses query 304 to form request 292 via one or more search engines, and optionally, separately and/or as part of request 292, uses the links in links 236 to fetch data from source 290.

Searcher 330 obtains or acquires raw data 294 from source 290. The acquired data may constitute files or other data structures, for example, files in HTML format.

In order to clean the data of extraneous ingredient, searcher 330 processes raw data 294 by operations such as one or more of the following exemplary operations.

Removal of textual terms that are part of the file format, for example internal tags of HTML format.

Removal of syntactic characters as for example: '.', ',', or '?'.

Removal of strings which contain non-letter characters, for example removal of '@' from '@domain.com'.

Separation of sentences to utterances of words in case there is one or more strings that are removed. For example: the sentence 'I will eat @my home today' will be separated into two sentences: 'I will eat', 'home today'.

Searcher 330 may further process raw data 294, such as by formatting and/or arrangement, thereby generating as an output thereof potential data 238.

Generally, potential data 238 is arranged or organized in data structures, referred to also as pages, which contain sentences or utterances.

FIG. 4 schematically illustrates data and control flow of filtering module 240 of apparatus 200, as represented by a dotted frame 444, according to exemplary embodiments of the disclosed subject matter.

Search module 240 comprises two components operative therein. One component, denoted as a semantic filter 410, performs a semantic test by determining whether contents of a page in potential data 238 are semantically sufficiently close to the textual data in seed data 232. Pages that pass semantic test, the passed pages denoted as semantically filtered data 402, are provided by semantic filter 410. Another, optional, component, denoted as a lexical filter 420, performs a lexical test on the utterance scale by determining whether each utterance of a page in semantically filtered data 402 contains at least one word or a phrase from dominant phrases and/or topics 234. Utterances that pass lexical test, construct the passed pages denoted as lexically filtered data 404, are provided by lexical filter 420.

Depending on a provided control as switch 244 that affects selector 406 and selector 408 (which could be implemented as one selector), semantically filtered data 402 are outputted by search module 230 as filtered data 246, or, alternatively, lexically filtered data 404 are outputted by search module 230 as filtered data 246.

Filtered data 246, is generally formed a list and/or other arrangement of pages having contents that passed the tests as described above.

The pages or utterances whose contents did not pass the semantic test, or, depending on a control of switch 244, did not pass the lexical test, are discarded.

In some embodiments, semantic filter 410 employs a semantic mapper to map the page contents to a vector of weights, where each dimension of the vector represents a context. As an example, the implementation of the semantic mapper can follow derivations as in E. Gabrilovich and S. Markovitch, *Computing semantic relatedness using wikipedia-based explicit semantic analysis*, Proceedings of The 20th International Joint Conference on Artificial Intelligence, Hyderabad, India, January 2007.

Thus, both the page contents and seed data 232 are mapped to vectors, V[page] and V[seed], respectively. The degree of relatedness between the two vectors is measured by a similarity function, mathematically defined as a mapping of the two vectors to a real number. The similarity formulation is based on definitions of an inner product and norm in the vector space. The similarity can be calculated by first normalizing each vector by its norm value. The normalized vectors are denoted as Vn[page], Vn[seed], respectively. Subsequently, the similarity function is calculated as an inner product of the two normalized vectors.

Said process is expressed in the following formulas (1)-(3):

$$Vn[page]=V[page]/Norm(V[page]) \quad (1)$$

$$Vn[seed]=V[seed]/Norm(V[seed]) \quad (2)$$

$$SIM(V[page], V[seed])=Inner(Vn[page], Vn[seed]) \quad (3)$$

Where V[x] is a mapped vector of textual contents of x, Norm(x) is a norm of vector x, Vn[x] is a normalized vector of x, Inner(x,y) represents a vector inner product of x and y, and SIM(x,y) represents a similarity of vectors x and y.

In some embodiments, the norm of a vector is the square root of the inner product of the vector with itself, and, in some embodiments, the inner product is a sum of the elements in a vector constructed by an element-wise multiplication of the input vectors.

A page, that is, the contents thereof, passes the semantic test in case the following condition in formula (4) is asserted.

$$SIM(V[page], V[seed])>Ts \quad (4)$$

Where Ts is a positive threshold which is smaller than 1, and wherein the threshold Ts, provided as semantic limit 242, may be defined by a user and/or is pre-set.

FIG. 5 schematically illustrates data and control flow of an adaptation module 250 of apparatus 200, as represented by a dotted frame 555, according to exemplary embodiments of the disclosed subject matter.

Adaptation module 250 comprises two components operative therein.

One component, denoted as a vocabulary generator 510, generates adapted vocabulary 256 as vocabulary of words that are determined as highly likely to be appear in an audio data that pertain to the domain of interest, while restricting in the vocabulary the amount of words the are less likely to appear in the audio data.

In some embodiments, based on filtered data 246, baseline data 258 and further, optionally, on dominant phrases and/or topics 234, all comprising textual words and/or phrases, vocabulary generator 510 determines the frequency of the words, or phases, and incorporates in adapted vocabulary 256 the most frequent ones up to a preset or determined maximal limit.

In some embodiments, other methods may be used for determining the words, or phrase, for adapted vocabulary 256. For example, words in filtered data 246 and baseline data 258 are tagged or categorized according to part of speech, selecting words of highest frequency up to a maximal limit from category, and jointly merging all the selected words into adapted vocabulary 256.

In some embodiments, determining frequency of words may be based on histograms or on any suitable technique such as sorting.

Adaptation module 250 comprises another component, denoted as a model generator 520, generates adapted LM 254 which is trained based on filtered data 246 and baseline data 258.

Training of adapted LM 254 may be carried out by and/or based on any suitable method or technique for language modeling and/or training. For example, linear interpolation, Maximum A-posteriori adaptation, class-based language model generation, Maximum-Entropy Modeling, Neural Networks and/or any combination thereof.

FIG. 6 schematically illustrates data and control flow of validation module 270 of apparatus 200, as represented by a dotted frame 666, according to exemplary embodiments of the disclosed subject matter.

Validation module 270 comprises a component operative therein, denoted as a word error rate test 610, that performs two speech recognitions of audio 276 which comprises a set of test audio signals and, consequently, compares the word error rate (also denoted as WER) between the speech recognitions with respect to transcript 278 which comprises corresponding accurate transcripts of audio 276.

Specifically, the first speech recognition is based on adapted LM 254 and adapted dictionary 262, whereas the second speech recognition is based on baseline LM 252 and baseline dictionary 272, where both of the cited speech recognitions utilize acoustic model 274 which is a baseline acoustic model that probabilistically maps speech fragments to acoustic features.

According to error limit 282 that is provided as a threshold to determine whether the difference in error rate is acceptable or passed, word error rate test 610 generates as an output a binary value code such as True/False or 1/0, denoted as an E-Pass 602, respectively indicating whether the threshold condition is held.

Validation module 270 further comprises another component, denoted as a perplexity test 620, which is operative to compare by perplexities the predictive capability of the adapted LM 254 versus baseline LM 252 with respect to domain text 284.

Depending on a control as switch 788 that affects selector 606 and selector 608 (which could be implemented as one selector), perplexity test 620 is invoked.

According to perplexity limit 286 that is provided as a threshold to determine whether the difference of the perplexities is acceptable or passed, perplexity test 620 generates a code such as True/False or 1/0, denoted as a P-Pass 604, respectively indicating whether the threshold condition is held.

Validation module 270 further comprises another component, denoted as a validation resolver 630, which determines validation decision 296 which is coded by a code such as True/False or 1/0 for pass or fail, respectively, denoting whether the validation has passed or failed.

According to selector 608, validation resolver 630 determines validation decision 296 either based on E-Pass 602 or, alternatively, based on E-Pass 602 and P-Pass 604.

In other words, in case perplexity test 620 is not enabled by switch 788, validation decision 296 is, or based on, E-Pass 602. Alternatively, in case perplexity test 620 is enabled by switch 788 then validation decision 296 is, or based on, E-Pass 602 and P-Pass 604 such as a logical conjunction, for example, E-Pass 602 AND P-Pass 604.

The operation of validation module 270 is further elaborated below.

FIG. 7 schematically illustrates data and control flow of word error rate test 610 of validation module 270, as represented by a dotted frame 777, according to exemplary embodiments of the disclosed subject matter.

Word error rate test 610 comprises two sub-systems for speech recognition of audio 276 which comprises a set of test audio signals that pertain to the domain of interest, as follows.

Sub-system 702, represented by a dotted frame 772, is operative in word error rate test 610 for speech recognition based on adapted LM 254 and adapted dictionary 262 as well as acoustic model 274, and by decoding the audio signals by a speech decoder, denoted as decoder 710a, yields a transcript, denoted as an adapted transcript 712, of the test audio signals Sub-system 704, represented by a dotted frame 774, is operative in word error rate test 610 for speech recognition based on baseline LM 252 and baseline dictionary 272 as well as acoustic model 274, and by decoding the audio signals by a speech decoder, denoted as decoder 710b, yields a transcript, denoted as an baseline transcript 714, of the test audio signals.

The operation of the speech recognition sub-systems is as known in the art, for example, as apparatus 100 or a variation thereof.

In order to determine the error rate in decoding the audio signals, the transcripts are compared to corresponding accurate transcripts of the audio signals.

Thus, adapted transcript 712 is provided to an error rate calculator component comprised and operative in word error rate test 610, denoted as WER calculator 720a, together with transcript 278. WER calculator 720a computes the error rate respective to adapted LM 254 and adapted dictionary 262, that error rate denoted as A-WER 716.

Likewise, baseline transcript 714 is provided to an error rate calculator component comprised and operative in word error rate test 610, denoted as WER calculator 720b, together with transcript 278. WER calculator 720b computes the error rate respective to baseline LM 252 and baseline dictionary 272, that error rate denoted as B-WER 718.

Word error rate test 610 further comprises a component operative therein, denoted as a WER resolver 730, which receives A-WER 716 and B-WER 718 together with error limit 282 provided as a threshold for error rates difference, and determines whether the difference between A-WER 716 and B-WER 718 agrees with the threshold, and outputs the determination's result as E-Pass 602 according to the following formula (5):

$$WER[Baseline]-WER[adapted]>Te \quad (5)$$

Where WER[Baseline] equals B-WER 718, WER[adapted] equals A-WER 716 and Te equals error limit 282.

Accordingly, E-Pass 602 is assigned a binary value such as True/False or 1/0, respectively, if the condition in formula (5) holds, indicating, respectively, whether the speech recognition of sub-system 702 related to the domain of interest is substantially better with respect to Te than the recognition of sub-system 704.

It is noted that decoder 710a and decoder 710b may be identical or equivalent, and in some embodiments, one decoder operates as both decoder 710a and decoder 710b.

Likewise, WER calculator 720a and WER calculator 720b may be identical or equivalent, and in some embodiments, one WER calculator operates as both WER calculator 720a and WER calculator 720b.

FIG. 8 schematically illustrates data and control flow of a perplexity test 620 of validation module 270, as represented by a dotted frame 888, according to exemplary embodiments of the disclosed subject matter.

Perplexity test 620 comprises two components for perplexity computation of a language model with respect domain text 284 which comprises test text pertaining to the domain of interest.

One component for perplexity computation, denoted as perplexity computation 810a, computes the perplexity of adapted LM 254 with respect to the domain text 284, and generates a result denoted as A-PPL 802.

Another component for perplexity computation, denoted as perplexity computation 810b, computes the perplexity of baseline LM 252 with respect to the domain text 284, and generates a result denoted as B-PPL 804.

Perplexity test 620 further comprises a component operative therein, denoted as a perplexity resolver 820, which receives A-PPL 802 and B-PPL 804. Perplexity test 620 receives also perplexity limit 286 that is provided as a threshold for a final decision on a language model as described below. Accordingly, perplexity test 620 determines whether the ratio between the difference of A-PPL 802 and B-PPL 804 relative to B-PPL 804 agrees with the threshold, and outputs the determination's result as P-Pass 604 according to the following formula (6):

$$(PPL[base]-PPL[adapted])/PPL[base]>Tp \quad (6)$$

Where PPL[base] equals B-PPL 804, PPL[adapted] equals A-PPL 802 and Tp equals perplexity limit 286.

Accordingly, P-Pass 604 is assigned a binary value such as True/False or 1/0, respectively, if the condition in formula (6) holds, indicating, respectively, whether the predictive capability of the adapted language model versus the baseline language model with respect to a set of test text pertaining to the domain of interest is substantially better as judged by Tp.

It is noted that perplexity computation 810a and perplexity computation 810b may be identical or equivalent, and in some embodiments, one component operates as both perplexity computation 810a and perplexity computation 810b.

FIG. 9 schematically illustrates an apparatus 900, as represented by a dotted frame 999, for election of a language model and corresponding dictionary and for employment thereof for transcription of an audio data, according to exemplary embodiments of the disclosed subject matter.

Depending on validation decision 296 that affects a selector 910, either adapted LM 254 and adapted dictionary 262 or, alternatively, baseline LM 252 and baseline dictionary 272, are respectively selected as an elected model 902 and an elected dictionary 904.

Elected model 902 and elected dictionary 904, together with acoustic model 274, are provided to a speech recognition sub-system denoted as a speech recognition sub-system 906, as represented by a dotted frame 992, comprising a decoder 920 for decoding a provided run-time and/or operational speech signal related and/or pertaining to the domain of interest, denoted as real audio 930.

Speech recognition sub-system 906 operates as or similar to sub-system 702 or apparatus 100 or a variation thereof, where decoder 920 decodes real audio 930 by using the provided elected model 902, elected dictionary 904 and acoustic model 274 thereby generating a transcript, denoted as a transcription 932, of real audio 930.

FIG. 10 outlines operations 1000 of adapting a language model and using thereof, according to exemplary embodiments of the disclosed subject matter.

In operation 1002 topics such as one or more words and/or dominant phrases are extracted from data of and/or related to a domain. The topics may be extracted directly from the data of the domain or indirectly such as from partial data related to a domain, for example, from a seed data.

In operation 1004 records from a large source are acquired at least by the topics. For example, the topics are used to form queries and the records are acquired by a search engine. Optionally, one or more given phrases are used to form queries to obtain further records. Optionally or additionally, records are acquired by one or more given links to the large source.

In operation 1006 contents of the records that are irrelevant to the context of the domain are removed, thereby attaining filtered data.

In operation 1022, optionally, responsive to a provided control for iteration and data for maximal iterations, the search is repeated or iterated up to maximal iterations according to operation 1024 described below.

In operation 1024 further topics and/or dominant phrases are obtained from the filtered data, and further records are acquired from the large source, as indicated by an arrow 1032. The records are subsequently filtered out of irrelevant contents, thus augmenting or supplementing the filtered data.

Otherwise, in case no control for iteration is provided and/or by default, in operation 1008, based on the filtered data and baseline textual data (as baseline textual resources), an adapted language model is generated by incorporating the filtered data and baseline data, thereby generating an adapted language model for the context of the domain.

Generally, the baseline model is accompanied with a corresponding baseline phonetic dictionary, and based on the filtered data and a corresponding an adapted phonetic dictionary is generated for the adapted language model.

Basically, the adaptation of the baseline language model is thus accomplished.

In order to evaluate the quality of the adapted language model in recognizing terms of the context of the domain, in operation 1012, optionally, the performance of term recognition of the adapted language model relative to the performance of the baseline language model is evaluated, generally employing, respectively, decoders and acoustic and phonetic models.

Optionally, in operation 1026 it is checked or decided whether to try to improve the adapted language model in case the performance of the adapted language model is not sufficiently better than that of the baseline language model. In case it is decided to attempt an improvement, in operation 1028 other topics based on data of a domain and/or data related to the domain such as dominant phrases are obtained such as described above, and a new search is conducted in the large source thus acquiring other records from the large source, as indicated by an arrow 1034 denoting an iteration. Optionally, the semantic limit used for filtering is modified for the iteration.

The improvement repetitions or iterations are carried out until a given limit is reached and/or the performance of the adapted language model is determined to be sufficiently satisfactory.

If it is not decided to attempt an improvement of the adapted language model then, optionally, in operation 1014, the adapted language model is elected for further use such as for terms recognition in case the performance of the adapted language model is determined to be sufficiently satisfactory, or, otherwise, the baseline language model is elected. Generally, respective to the elected language model a phonetic dictionary is elected.

Further, optionally, in operation 1016, the elected model, generally with a corresponding elected phonetic dictionary, is used to perform speech recognition on audio data pertaining to the domain. For example, recognition of speech of a party of the domain.

For clarity, the optional operations in operations 1000 are indicated by dashed or dotted elements.

It is noted that, in some embodiments, some and/or all the optional operations in operations 1000 are not performed. Similarly, in some embodiments, some and/or all the optional operations in operations 1000 are performed.

It is further noted that operations 1000 and descriptions thereof are provided as a non-limiting example, and that one or more operations and/or order thereof may be varied.

Thus, an exemplary synopsis according to exemplary of embodiments of the present disclosure is provided below.

As a preliminary stage a user defines a domain of interest using some textual data representative of the domain defined as seed data. Optionally or additionally, the user may refer to the target domain by one or more direct links to large source that include textual data pertaining to the domain. For example, in case the large source is the Web, the direct links can be URL links to sites that refer to the domain of interest. Optionally or alternatively, the domain may be represented by a list of relevant topics or dominant phrases that pertain to the domain. For example, if the domain is "Electronics", a list of topics or dominant phrases could include phrases such as 'Hardware', 'Circuits design', 'Computers' and/or other phrases to that effect.

Further, a search is performed by extracting topics or dominant phrases from the seed data and generating queries to be searched in the large source using a search engine. In case the data source is the Web, the search engine can be, for example, Yahoo or Google search engines. Optionally, the queries may be performed also by incorporating list of topics or dominant phrases provided by a user. Optionally or additionally, the search may be performed by a list of links provided by a user.

The data acquired from the search potentially include data or phrases or a Web page pertaining to the domain, referred to below also as potential data, where the contents of the potential data are also referred to below, without limiting as documents.

The potential data is filtered in order to remove any textual information that doesn't pertain to the domain of interest. The filtering is performed in one or two stages. The first stage is filtering out the potential data in which each document is semantically compared to the seed data. A user defined threshold is used to perform binary decision whether to approve the document or remove it. Optionally, in a second stage, documents that positively passed the semantic filtering are further filtered on an utterance scale as follows. Each document is separated to a list of sentences or utterances and the filter positively approves an utterance in case the utterance includes at least one phrase from a pre-defined list of dominant phrases provided by the user.

The filtered data is incorporated with textual data of general context in order to generate a vocabulary fitted to the domain, thereby generating an expanded vocabulary that potentially pertain to the domain of interest.

The expanded vocabulary is used along with the acquired textual data and/or the baseline textual resources for training and adapting a language model to improve, at least potentially or partially, the performance of an overall speech recognition system.

In some embodiments, the filtered data is incorporated into a training process of a language model which will potentially improve the performance of an overall speech recognition system. Optionally, the performance is validated to insure a determined minimal performance requirement of the adapted language model.

There is thus provided according to the present disclosure a method for adapting a language model for a context of a domain, comprising obtaining textual contents from a large source by a request directed to the context of the domain, discarding at least a part of the textual contents that contain textual terms determined as irrelevant to the context of the domain, thereby retaining, as retained data, at least a part of the textual contents that contain textual terms determined as relevant to the context of the domain, and adapting the language model by incorporating therein at least a part of the textual terms of the retained data, wherein the method is performed on an at least one computerized apparatus configured to perform the method and equipped for communication with the large source.

In some embodiments, at least a part of the retained data having at least one textual term which do not match any element in a provided set of at least one textual term is discarded prior to adapting the language model.

In some embodiments, the at least a part of the textual contents that contains textual terms determined as irrelevant to the context of the domain comprises a plurality of parts of the textual contents that contains textual terms determined as irrelevant to the context of the domain.

In some embodiments, the at least a part of the textual content that contains textual terms determined as relevant to the context of the domain comprises a plurality of parts of the textual contents that contain textual terms determined as relevant to the context of the domain.

In some embodiments, the textual contents are further obtained via a provided at least one link to the large source.

In some embodiments, the large source is at least a part of the Web.

There is thus further provided according to the present disclosure a method for adapting a baseline language model for a context of a domain by data of the Web, comprising obtaining, from the domain, data representative of the context of the domain, and based on the data representative of the context of the domain, forming a query that is provided to an at least one search engine of the Web, thereby acquiring an at least one result comprising textual contents, and discarding at least a part of the at least one result in which the textual contents includes at least one textual term that does not pertain to the data representative of the context of the domain, and adapting the baseline language model to an adapted language model by incorporating therein textual terms of the at least one result that pertain to the data representative of the context of the domain, wherein the method is performed on an at least one computerized apparatus configured to perform the method and equipped for communication with at least one computerized server linkable to the Web.

In some embodiments, the discarding of the at least a part of the at least one result comprises discarding all parts of the at least one result in which the textual contents comprises at least one textual term that does not pertain to the data representative of the context of the domain.

In some embodiments, the discarding of the at least a part of the at least one result comprises discarding the at least one results in which the textual content includes at least one textual term that does not pertain to the data representative of the context of the domain.

In some embodiments, the method further comprises discarding at least a part of the at least one result having textual terms which do not match any element in a provided set of at least one textual term.

In some embodiments, the acquiring at least one result further comprises acquiring further textual contents via a provided at least one link to a Web site.

In some embodiments, the at least one result comprises a plurality of results.

In some embodiments, the textual terms that pertain to the data representative of the context of the domain are determined based on a semantic relationship between the textual terms and the data representative of the context of the domain.

In some embodiments, the method further comprises evaluating the adapted language model by comparing the performance of the adapted language model with the performance of the baseline language model in recognizing textual terms in a provided speech data comprising coded textual terms related to the domain.

In some embodiments, the provided data is an audio data comprising spoken words related to the domain.

In the context of some embodiments of the present disclosure, by way of example and without limiting, terms such as 'operating' or 'executing' imply also capabilities, such as 'operable' or 'executable', respectively.

Conjugated terms such as, by way of example, 'a thing property' implies a property of the thing, unless otherwise clearly evident from the context thereof.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a computerized system or a similar term denotes an apparatus comprising one or more processors operable or operating according to one or more programs.

As used herein, without limiting, a module represents a part of a system, such as a part of a program operating or interacting with one or more other parts on the same unit or on a different unit, or an electronic component or assembly for interacting with one or more other components.

As used herein, without limiting, a process represents a collection of operations for achieving a certain objective or an outcome.

As used herein, the term 'server' denotes a computerized apparatus providing data and/or operational service or services to one or more other apparatuses.

The term 'configuring' and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A method for adapting a language model for a context of a domain, comprising;
   from a source having textual information with a variety of phrases related to the context of the domain obtaining textual contents as data directed to the context of the domain by querying the source with phrases representative of the subject matter of the domain regardless and irrespective of any language model;
   responsive to a state of a provided selector, determining is one state semantic relevancy or in another state semantic relevancy and lexical relevancy of the textual contents to the context of the domain;
   discarding at least a part of the textual contents that contain textual terms determined as irrelevant to the context of the domain, thereby retaining, as retained data, at least a part of the textual contents that contain textual terms determined as relevant to the context of the domain; and
   adapting the language model by incorporating therein at least a part of the textual terms of the retained data,
   wherein the method is performed on an at least one computerized apparatus configured to perform the method and equipped for communication with the source.

2. The method according to claim 1, wherein at least a part of the retained data having at least one textual term which do not match any element in a provided set of at least one textual term is discarded prior to adapting the language model.

3. The method according to claim 1, wherein the at least a part of the textual contents that contains textual terms determined as irrelevant to the context of the domain comprises a plurality of parts of the textual contents that contains textual terms determined as irrelevant to the context of the domain.

4. The method according to claim 1, wherein the at least a part of the textual content that contains textual terms determined as relevant to the context of the domain comprises a plurality of parts of the textual contents that contain textual terms determined as relevant to the context of the domain.

5. The method according to claim 1, wherein the textual contents are further obtained via a provided at least one link to the source.

6. The method according to claim 1, wherein the source is at least a part of the Web.

7. The method according to claim 1, wherein determining semantic relevancy of the textual contents directed to the context of the domain comprises determining Whether the contents of the textual contents directed to the context of the domain—referred to also as a page content—are sufficiently semantically close to an at least one textual phrase pertaining to a domain—referred to also as a seed—wherein the page content that is sufficiently semantically close to the seed is referred to also as semantically filtered data.

8. The method according to claim 7, wherein the determination of semantically closeness of the page content and the seed comprises mapping the page content and the seed to vectors V[page] and V[seed], respectively, and measuring the degree of relatedness between said two vectors by a similarity function mathematically defined as a mapping of said two vectors to a real number.

9. The method according to claim 8, wherein the page content is determined to have passed a semantic test when the value of the similarity function applied on V[page] and V[seed] is larger than a threshold that is a positive value smaller than 1.

10. The method according to claim 8, wherein the threshold is preset.

11. The method according to claim 8, wherein the threshold is determined by a user.

12. The method according to claim 8, wherein the similarity function similarity is calculated by normalizing each of the vectors by its norm value, denoted respectively as Vn[page] and Vn[seed], and subsequently calculating an inner product of Vn[page] and Vn[seed].

13. The method according to claim 12, wherein the nom of a vector is the square root of the inner product of the vector with itself.

14. The method according to claim 12, wherein the inner product of a vector is a sum of the values of the elements in a vector constructed by an element-wise multiplication of the vector.

15. The method according to claim 7, wherein determining lexical relevancy of the textual contents to the context of the domain comprises determining whether utterances in the semantically filtered data contains at least phrase—without precluding a word—from provided phrases related to the domain.

16. A method for adapting a baseline language model for a context of a domain by data of the Web, comprising:
obtaining, from the domain, textual data as data representative of the context of the domain;
based on the data representative of the context of the domain and regardless and irrespective of any language model, forming a query that is provided to an at least one search engine of the Web, thereby acquiring an at least one result comprising textual contents;
responsive to a state of a provided selector, determining in one state semantic relevancy or in another state semantic relevancy and lexical relevancy of the at least one result to the context of the domain;
discarding at least a part of the at least one result in which the textual contents includes at least one textual term that does not pertain to the data representative of the context of the domain;
adapting the baseline language model to an adapted language model by incorporating therein textual terms of the at least one result that pertain to the data representative of the context of the domain,
wherein the method is performed on an at least one computerized apparatus configured to perform the method and equipped for communication with at least one computerized server linkable to the Web.

17. The method according to claim 16, wherein the discarding of the at least a part of the at least one result comprises discarding all parts of the at least one result in which the textual contents comprises at least one textual term that does not pertain to the data representative of the context of the domain.

18. The method according to claim 16, wherein the discarding of the at least a part of the at least one result comprises discarding the at least one results in which the textual content comprises at least one textual term that does not pertain to the data representative of the context of the domain.

19. The method according to claim 16, further discarding at least a part of the at least one result having textual terms which do not match any element in a provided set of at least one textual term.

20. The method according to claim 16, wherein the acquiring at least one result further comprises acquiring further textual contents via a provided at least one link to a Web site.

21. The method according to claim 16, wherein the at least one result comprises a plurality of results.

22. The method according to claim 16, Wherein the textual terms that pertain to the data representative of the context of the domain are determined based on a semantic relationship between the textual terms and the data representative of the context of the domain.

23. The method according to claim 16, further comprising evaluating the adapted language model by comparing the performance of the adapted language model with the performance of the baseline language model in recognizing textual terms in a provided speech data comprising coded textual terms related to the domain.

24. The method according to claim 23, wherein the provided data is an audio data comprising spoken words related to the domain.

25. The method according to claim 23, wherein evaluating the adapted language model comprises calculating as first word error rate respective to the adapted language model and a second word error rate respective to the baseline language model, and determining if the difference between the first and the second word error rates passes an error limit.

26. The method according to claim 25, wherein evaluating the adapted language model further comprises comparing the predictive capability of the adapted language model versus the baseline language model with respect to a set of test text pertaining to the domain.

27. The method according to claim 26, wherein comparing the predictive capability of the adapted language model versus the baseline language model comprises calculating a perplexity measure based on a first perplexity value that corresponds to a perplexity of the adapted language model with respect to the test text pertaining to the domain, and a second perplexity value that corresponds to a perplexity of the baseline language model with respect to the test text pertaining to the domain, and comparing the perplexity measure to a perplexity limit.

* * * * *